PHASE EQUALISER ARRANGEMENTS

Filed Sept. 12, 1967 2 Sheets-Sheet 1

3,496,494
PHASE EQUALISER ARRANGEMENTS

Michael G. T. Hewlett and John K. Coldwell, Ilford, England, assignors to The Plessey Company Limited, Ilford, England, a British company Filed Sept. 12, 1967, Ser. No. 667,268
Int. Cl. H03h 7/30
U.S Cl. 333—28 4 Claims

ABSTRACT OF THE DISCLOSURE

An equaliser comprising a coaxial delay line which has a phase shifting or phase selecting arrangement tapped into the delay line at equal intervals along the effective length of the delay line and an adding arrangement for adding the outputs from the phase shifting or phase selecting arrangements to provide a single output waveform at the output of the adding arrangement.

This invention relates to phase equaliser arrangements by which different frequency components of an input signal can be time displaced by varying amounts according to frequency. Such equaliser arrangements are commonly used in pulse compression radar systems and in those in which beam scanning may be effected. Beam scanning can be effected by feeding a single pulse of continuously varying frequency conveniently considered as a succession of pulses appertaining respectively to different beams being scanned, to a so-called serpentine aerial by which the energy front of the transmitted pulse is tilted with change in frequency. This method of scanning is utilised in the so-called "Squirt" radar system in which vertical scanning is achieved by transmitting a pulse of continuously varying frequency which corresponds to a number of adjacent vertical beams. For example, it may be arranged that the beams are each of 2° width so that by the transmission of what may be regarded as four pulses—one per beam width—a scan of 8° can be achieved.

To compensate for the frequency/time characteristic of a receive signal it is necessary to feed the received signals to an equaliser arrangement which usually consists of a bridged-T network serving to delay the lower frequency components of the echo signal. Such networks are very expensive to manufacture as well as being very bulky and also need to be set at considerable cost before being put in service. Also they have serious limitations which will hereinafter be apparent when the present invention is specifically described.

In the case of pulse radar systems the equalisers are usually arranged to compress echo signals with a view to amplification thereof for distinguishing clearly from spurious and/or noise signals.

In pulse compression radar systems it is customary to employ signals having a continuously varying frequency usually varying linearly but it is also known to use signals whose frequencies vary according to other laws (e.g. cubic law).

The present invention has in view an improved equaliser arrangement for providing any desired frequency/time delay or phase characteristic which is eminently suitable for use in pulse radar systems, particularly the system known as the "Squirt" system, for equalisation and pulse compression purposes.

According to the present invention in its broadest aspect an equaliser arrangement comprises signal delay means, phase qualification means spaced evenly along the effective length of the signal delay means and means for adding the outputs from the phase qualification means.

In applying the equaliser arrangement to radar systems for example the signal delay means conveniently takes the form of a coaxial delay line but it is to be understood that the signal delay means could be of any other suitable form (e.g. optical form with the passage of light being suitably modulated, such as by quartz crystal, and the phase thereof being appropriately qualified, by mirrors for example, at evenly spaced intervals along the length of the light path).

When an electrical delay line is used the phase qualification means may conveniently comprise phase shifting or selecting means in which the phase shifting means comprises resistor-capacitor networks whereas phase selection from an input signal contained by the delay means may be effected by the appropriate positioning of slider or other adjustment tap means constituting the phase selecting means in the vicinity of substantially equi-spaced points along the length of the delay line. By suitable adjustment of the phase shifting or phase selecting means it is possible to derive a frequency/time delay characteristic which is complementary to that of an input signal. For example, this is particularly valuable in pulse radar systems where compensation needs to be made in the equaliser for frequency/time delay characteristic of a dispersive serpentine aerial.

It will be appreciated that the phase shifting or selecting means are spaced evenly along the delay line so that equal intervals occur between successive tapping points.

In applying the equaliser arrangement of the invention to a "Squirt" radar system it may be arranged that each of the pulses that is received due to scanning is of such duration that it can just be contained by the delay line. The phase shifting or phase selecting means will be connected to the delay line at equal intervals along its length and so adjusted that the signal voltages at the taps can be coherently added by the adding means which may simply take the form of a resistor network.

As has heretofore been mentioned in the so-called "Squirt" system a swept frequency modulated pulse, which can be considered as a succession of pulses each of which appertains to a particular beam to be scanned, is utilised for elevation scanning. This single pulse after transmission may have a part thereof reflected back by a target to a receiver and this reflected part may be fed to the input of an equaliser arrangement according to the present invention the delay line of which may be of such length that the single pulse could just be contained by it. A significant advantage could be had as regards the size and cost of the equaliser according to the invention by arranging that the delay line has a length which just accommodates one of the succession of pulses referred to above which make up the single pulse and by relying on the repetitive frequency/time delay characteristic of the equaliser. Thus any echo signals will be fed to the input of the equaliser for equalisation of frequency components and for the compression of the echo signals to give clear discrimination over noise, other targets and clutter.

It is contemplated that the signal fed to the equaliser to be compressed will normally be fed into the signal delay means at one end thereof but it is also envisaged that time inverted signals may be fed into the delay means at the respective ends thereof to provide amplitude equalisation of line losses in which case any line matching will be afforded by the impedances of the signal generating means.

Although it has been mentioned that the phase shifters or phase selecting means are located at equal intervals along the length of the delay line there could be some reasonable departure from this state dependent of course upon the tolerable level of noise.

In some cases it may be desired to afford attenuation of signals tapped off along the line to take into account line losses and it may be required to attenuate certain frequency components to afford frequency weighting. To this end attenuators may be connected to the outputs from the phase shifters or phase selectors, as the case may be.

Amplifiers may advantageously be connected between the tapping points on the delay line which also serve to prevent reflections being transmitted back along the line due to mismatches.

For a better understanding of the present invention one exemplary embodiment of it will now be described with reference to the accompanying drawings in which.

Figure 8:
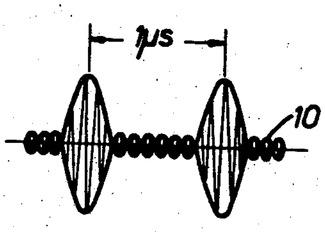

FIGURES 7*a* and 7*b* show compressed output pulses each containing two main peaks of energy having unequal amplitudes;

FIGURE 8 shows a compressed output pulse containing two main peaks of energy having equal amplitudes.

Figure 1:
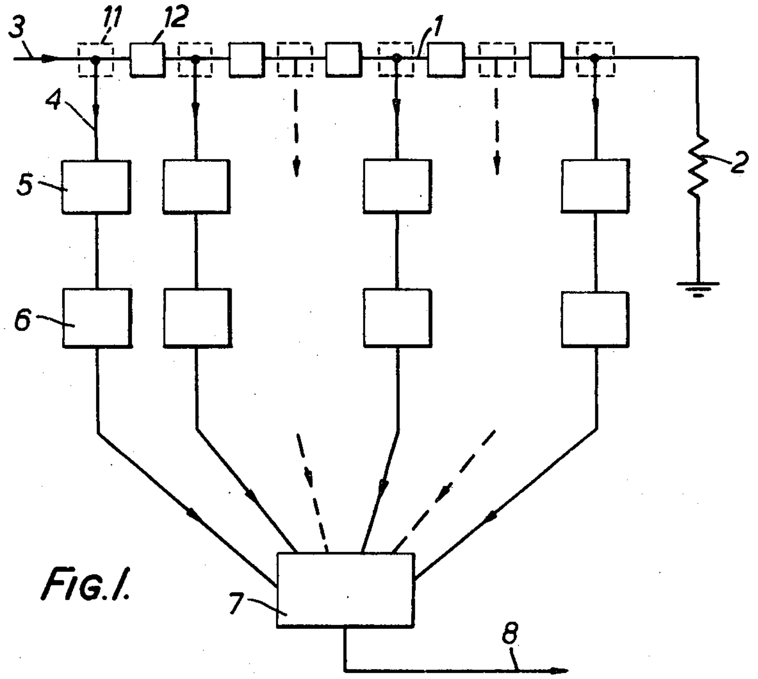
FIGURE 1 shows a block schematic diagram of a preferred equaliser circuit arrangement.

The equaliser circuit arrangement shown in FIGURE 1 comprises a coaxial delay line 1 which has a termination resistance 2 and an input 3, and which is tapped at regular intervals by taps 4. Each tap 4 is connected via a phase shifter 5 and an attenuator 6 to an adder unit 7 which is common to all taps and has an output 8. Between each tap 4 there is connected an amplifier 12 which prevents reflections occurring in the delay line due to mismatches.

Before considering the operation of this embodiment it will be advantageous to describe initially the transmitted signal. This comprises a square envelope pulse within which a carrier wave is continuously changing in frequency, the frequency excursion being a smooth linear change. This pulse is fed to a serpentine aerial, as hereinbefore mentioned which transmits the pulse, and in so doing scans a vertical plane, the elevation of scan varying in accordance with the frequency of the modulated pulse.

Figure 3:
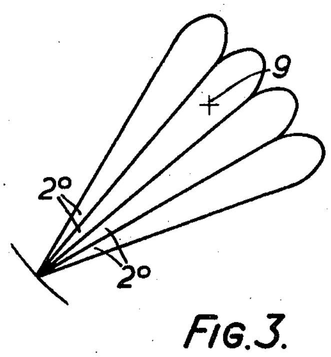
FIGURE 3 represents a vertical frequency scan of 8° comprising four beam widths.

For the purposes of explanation the modulated pulse may be considered as shown in FIGURE 3 as a succession of pulses (e.g. four) appertaining to different beams being scanned. In this embodiment the total angle through which scanning occurs is 8° and is considered as split into four beam widths each having an angle of elevation of 2° and having one quarter the total time duration of the pulse. The swept bandwidth is 40 mHz. and the total pulse duration is 4$\mu$ sec., therefore each beam width corresponds to linear frequency variations of 10 mHz. during a time of 1$\mu$ sec.

In practice however it will be appreciated that the elevation of 8° is scanned by one 2° beam width which continually changes in frequency and thus angle of elevation, resulting in echo signals of 1$\mu$ sec. duration (i.e. the time duration of one 2° of sweep).

Figures 4, 5:
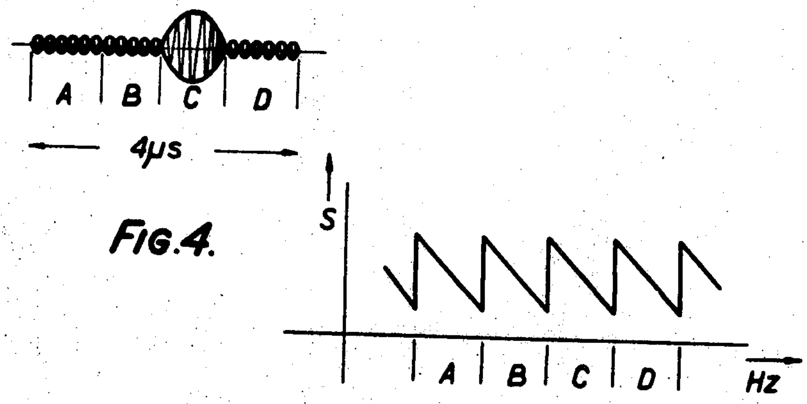
FIGURE 4 represents the voltage/time characteristic of an echo pulse.
FIGURE 5 shows the frequency/time delay characteristic of the equaliser circuit arrangement.

When a target 9, shown in FIGURE 3, is detected it will appear in at least one of the four beam widths and consequently be subjected to a frequency sweep resulting in a receive pulse having a voltage/time curve which may be as represented in FIG. 4. This pulse is fed into the delay line 1 such that as the pulse travels down the line signal voltages are tapped off which do not add coherently. These signals form range side lobes 10 but when the pulse is just fully contained within the line the tapping of the receive pulse and the setting of the phase shifters 5 are such as to provide coherent adding of the tapped signal voltages and random addition of the incoherent noise associated with radar systems.

It has already been mentioned that the taps 4 are equally spaced along the delay line 1 and by so doing the received signal to noise ratio is kept to a maximum. As regards the number of taps, and thus the spacing between them, it has been found that the signal to noise ratio can be maintained but not significantly improved by arranging that the number of taps is equal to the product of the received pulse duration (e.g. 1$\mu$ sec.) and the bandwidth (10 mHz.) plus one.

Figure 2:
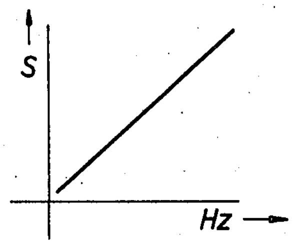
FIGURE 2 shows a frequency/time delay characteristic of a received signal.

The equaliser circuit arrangement has a frequency/time delay characteristic shown in FIGURE 5 which, by having an inverse slope, compensates for the frequency/time delay characteristic of the receive signal, as shown in FIGURE 2. FIGURE 5 shows a sawtooth frequency/time delay characteristic of the equaliser, each tooth corresponding to a particular 10 mHz. bandwidth. The advantage of this repetitive or periodic characteristic will hereinafter be described.

The tapped signal voltages derived at taps 4 are applied to the phase shifters 5 comprising resistor/capacity networks in which the phases of the respective signal voltages are corrected to enable coherent addition in the adding unit 7 to provide a resultant output 8 at the instant when the received signal is just contained by the delay line 1. The phase shifters 5 are adjusted to provide maximum peak amplitude output. The attenuators 6 may vary in attenuation from tap to tap to produce amplitude weighting of the output pulse (i.e. to minimise range side lobes) and/or to compensate for line losses applicable to the varying frequencies of the receive signal in the delay line.

Figure 6:
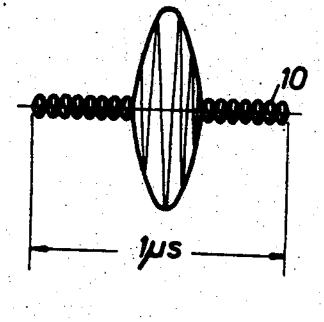
FIGURE 6 shows a compressed output pulse containing a single main peak of energy.
Figure 7:
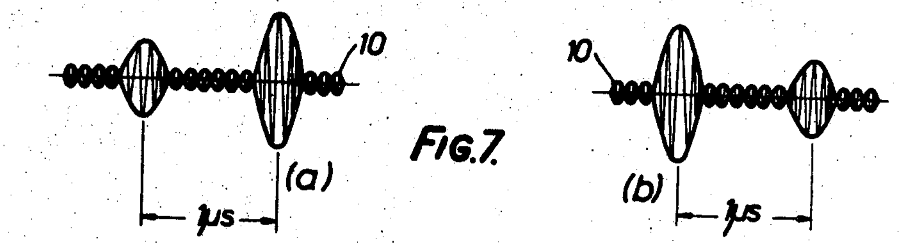

The adding unit 7 is a conventional type of adder and in the embodiment comprises a number of resistors, one for each tap, each connected to the output 8, producing compressed output pulses shown in FIGURES 6–8, which are then passed to a bank of filters (not shown) from which the frequency of the carrier wave within the compressed pulse is determined and thus the angle of elevation of the target is obtained.

As hereinbefore mentioned it is more advantageous with this system as regards cost and size of equipment to provide a delay line which is matched to one beam width only i.e. the delay line length is equal in time to a quarter of the time T of the full receive pulse, since the frequency/time delay characteristic is of a repetitive or periodic sawtooth form. As can be seen from the repetitive characteristic in FIGURE 5, the same sawtooth pattern is repeated for each band A, B, C or D, which in the present example is 10 mHz. wide. The equaliser would operate satisfactorily for the same adjustment of the phase shifters, as appropriate in the present embodiment, in any system in which the bandwidth of the scanning beams is 10 mHz., the operation being completely independent of actual frequency providing the phase correction produced by the phase shifters 5 is independent of frequency. In this connection it will be appreciated from the foregoing that the number of taps and thus the spacing between taps is also independent of frequency.

Application of this equipment to the "Squirt" radar system has an added advantage of fine height determination. This can be better explained by firstly considering the effect as shown in FIGURE 6 when a target is detected in the middle of one scanning beam producing an echo at a frequency which is the centre frequency of the frequency/time delay characteristic of the equaliser that is to say it is tuned to the equaliser centre frequency, a single compressed pulse will be produced. When the target is offset from the middle of the scanning beam then due to the echo being detuned with respect to the equaliser centre frequency for that band the output from the adder 7 will contain two main peaks of energy of unequal amplitude exactly 1$\mu$ sec. apart as shown in FIGURES 7*a* and 7*b*. With the target detected on the boundary between beams an output is produced which contains two main peaks of energy 1$\mu$ sec. apart of equal amplitude as shown in FIGURE 8. Thus the angle of elevation in each case is determined with reasonable accuracy by examination of the frequency of the carrier wave within each peak of energy, which when considered in conjunction with the relative amplitudes of the two peaks provides a system of much greater accuracy with which the angle of elevation may be obtained.

The use of attenuators in each tap 4 can provide the advantage of compensating for inherent losses within the delay line as well as affording attentuation of unwanted range side lobes.

Phase shifters 5 may be replaced by phase selectors 11 comprising a slider or other adjustment tap means which are represented by the broken outlines in FIGURE 1. The operation of the circuit will be as described above apart from the adjustment of the phase selector 11 to positions on the delay line where the correct phase will be selected.

It may be appreciated from this description that it is possible to apply the invention to a system in which a continuous smooth frequency change of say 200 mHz. in 20$\mu$ sec. takes place, appertaining to 20 different beams being scanned each in a time of 1$\mu$ sec. By applying the invention to this system it is still possible to match the frequency/time delay characteristic of the equaliser to one beam width sweeping 10 mHz. in 1$\mu$ sec. Thus for the same manufacturing costs required for the 40 mHz. bandwidth, 4$\mu$ sec. pulse duration system a much larger frequency change and pulse time can be accommodated.

In a system using a bridge-T-equaliser network it would be practically impossible both in size and cost to manufacture a bridged-T-equaliser network to contain a 200 mHz. change in frequency in a pulse time duration of 20$\mu$. sec.

It is also worth considering that the setting up and testing of a conventional bridge-T-equaliser comprising many hundreds of components can take many weeks, whilst it is envisaged that the invention comprising only tens of components will take a much shorter time, thus saving immensely on manufacturing costs.

What we claim is:

1. An equaliser arrangement having an input terminal to which is applied a pulsed, frequency modulated signal, signal delay means connected to said terminal for affording a predetermined delay to said signal, the overall delay of the signal delay means being substantially equal to the pulse length of said signal, phase-changing means spaced at points along the length of the signal delay means, the phase-changing means being variable to provide for continuous adjustment over a required range of phase change, and means connected to the phase-changing means for adding the outputs therefrom to afford a phase equalised signal.

2. An equaliser arrangement as claimed in claim 1, wherein the delay means takes the form of a coaxial delay line.

3. An equaliser arrangement as claimed in claim 1, wherein the signal delay means has amplifier means situated in the spaces between said phase changing means to prevent reflections occurring in said signal delay means.

4. An equaliser arrangement as claimed in claim 1, wherein attenuator means is situated between each phase changing means and said adding means to provide amplitude weighting of a signal at different frequencies.

References Cited

UNITED STATES PATENTS

| | | | |
|---|---|---|---|
| 2,414,541 | 1/1947 | Madsen | 333—31 XR |
| 2,759,044 | 8/1956 | Oliver | 333—70 XR |
| 2,896,176 | 7/1959 | Bellows | 333—28 |
| 2,922,965 | 1/1960 | Harrison | 333—28 |
| 3,135,932 | 6/1964 | Bangert | 333—28 XR |
| 3,372,350 | 3/1968 | Kawahashi et al. | 333—28 |

ELI LIEBERMAN, Primary Examiner

M. NUSSBAUM, Assistant Examiner

U.S. Cl. X.R.

333—31